June 25, 1957     T. K. KETONEN     2,796,896

MEANS FOR GUIDING MATERIAL IN A SAW MILL

Filed Nov. 10, 1954

INVENTOR.
TOIVO KALERVO KETONEN
BY
Michael S. Stalos
agt.

United States Patent Office 2,796,896
Patented June 25, 1957

2,796,896
MEANS FOR GUIDING MATERIAL IN A SAW MILL
Toivo Kalervo Ketonen, Lieksa, Finland
Application November 10, 1954, Serial No. 468,112
4 Claims. (Cl. 143—173)

The present invention relates to saws such as gang saws in saw mills where logs are trimmed.

Thus, it is conventional to process the logs in such saws so as to obtain from a log a beam of rectangular cross section. The logs are guided to the saw blades to be cut thereby, and when the logs are cut in planes parallel to the central axis of the logs, there may be a considerable amount of material trimmed from the logs depending upon the extent of taper thereof. It is most desirable to carry out this processing of the logs at the fastest possible rate and at the same time with a minimum of trim.

One of the objects of the present invention is to provide a guide means for such saw installations which will provide a far faster processing of the logs than with constructions hitherto known.

Another object of the present invention is to provide a guide means which easily enables the operator to saw the elongated stock either in planes parallel to the central axis of the stock, or in planes substantially parallel to one side of the stock, this latter operation resulting in a great saving of the material in cases where the tapering of the log is pronounced.

Also, it is an object of the present invention to provide a means which guarantees removal of the material cut from the logs both from the logs themselves and from the saw blades so that the operations need not be interrupted and the output is accordingly increased.

Furthermore, it is an object of the present invention to provide an exceedingly simple and rugged apparatus capable of accomplishing the above objects.

With the above objects in view the present invention mainly consists of an apparatus for sawing elongated stock of irregular cross section, this apparatus including a base means and a pair of guide rollers located over the base means and adapted to engage opposite outer side surfaces of the stock. A support means is carried by the base means and engages the rollers to support the same for independent rotation and for free movement independently of each other toward and away from each other so that the rollers automatically adapt themselves to variations in the cross section of the stock. A pair of weight means respectively act on the rollers through the support means to urge the rollers toward each other so that the rollers are applied against the stock with the pressure of the weight means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
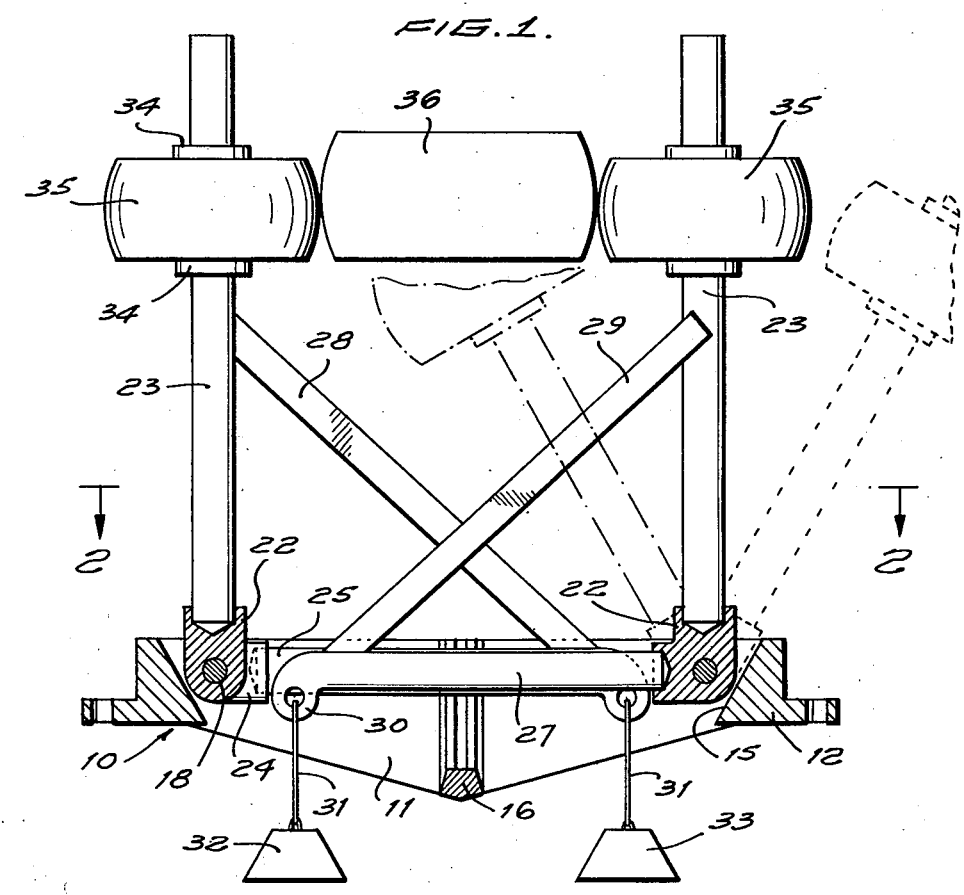
Fig. 1 is a partly sectional elevational view of an apparatus constructed in accordance with the present invention, Fig. 1 being taken along the line 1—1 of Fig. 2 in the direction of the arrows.
Figure 2:
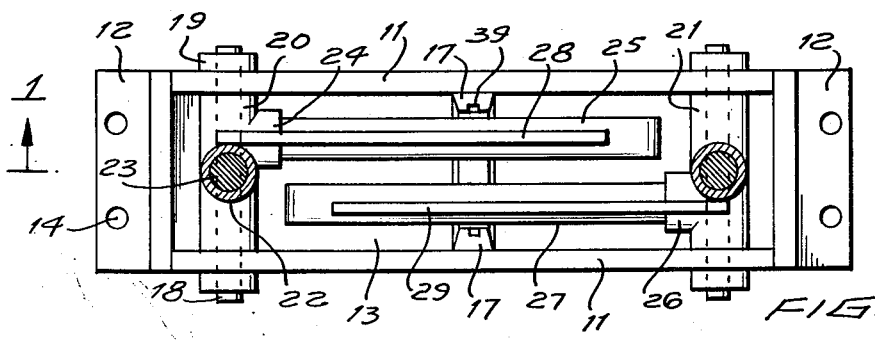
Fig. 2 is a sectional, plan view taken along the line 2—2 of Fig. 1 in the direction of the arrows.

Referring now to the drawings, and to Figs. 1 and 2 in particular, it will be seen that the structure of the invention includes a base 10 adapted to be mounted on a gang saw or the like ahead of the saw blades. This base 10 includes a pair of side walls 11 of substantially triangular shape, as is evident from Fig. 1, and a pair of end portions 12 interconnecting side walls 11 so that the base 10 defines a substantially rectangular space 13. The end portions 12 of the base 10 are provided with openings 14 through which bolts may pass to connect the guide means to the saw. As is evident from Fig. 1, the end portions 12 of the base 10 have inner side faces 15 which are inclined to the bottom horizontal faces of the end portions 12, and these faces 15 may make an angle of between 15° and 30° with a vertical plane for a purpose described below. Furthermore, the side walls 11 are interconnected at their bottommost portions by a cross bar 16 having a flat top face, and each side wall 11 has fixed to its inner face a grooved elongated member 17 leading down to the cross bar 16, as shown in Figs. 1 and 2. The elements 16 and 17 may be integral with the walls 11 or may be fixed thereto in any suitable manner.

A pair of shafts 18 respectively extend through aligned openings of the walls 11 and are fixed thereon through any suitable means such as, for example, the nuts 19 threaded onto the shafts 18 and engaging the outer faces of the walls 11. A sleeve 20 is freely turnable on the left shaft 18 of Figs. 1 and 2, while a sleeve 21 is freely turnable on the right shaft 18, these sleeves 20 and 21 being located between the walls 11. Substantially midway between the side walls 11 each of the sleeves 20 and 21 has connected thereto, as by being formed integrally therewith, an upwardly extending tubular portion 22.

A pair of elongated arms 23 are respectively fixed to and extend upwardly from the tubular portions 22, these arms 23 being, for example, threaded into the tubular portions 22, respectively. The sleeve 20 is provided with a second tubular extension 24 located nearer to the upper side wall 11 of Fig. 2 than the lower side wall of this figure, and the arm 25 is fixed to and extends from the tubular projection 24. It will be noted that this arm 25 is located in the space 13 in the position of the parts shown in the drawing. In the same way, the sleeve 21 is provided with a second tubular projection 26, but this tubular projection is centrally located between the walls 11. An arm 27 is fixed to and extends from the tubular projection 26 into the space 13. Thus, the left arm 23 and arm 25 form one bell crank while the right arm 23 and arm 27 form another bell crank. A reinforcing strut 28 may extend between and be fixed to the arm 25 and the left arm 23 of Fig. 1, and a corresponding strut 29 may extend between arm 27 and the right arm 23 of Fig. 1.

The arms 25 and 27 are each provided at their outer free ends with an eye 30 through which an elongated flexible member such as a cord, chain, or the like, 31 passes so that the members 31 are respectively fastened to and depend from the arms 25 and 27. A pair of weights 32 and 33 are respectively connected to and carried by the members 31 so that the weight 33 tends to turn the left bell crank of Fig. 1 in a clockwise direction, as viewed in Fig. 1, while the weight 32 tends to turn the right bell crank of Fig. 1 in a counterclockwise direction, as viewed in Fig. 1.

Each of the arms 23 has a pair of collars 34 fixed thereto by set screws or the like, and a guide roller 35 is turnably carried by each arm 23 between the collars 34 thereof. If desired, instead of arranging the rollers 35 between collars, the shafts 23 may be provided with shoulders on which any number of spacer sleeves rest, and the rollers 35 may be located between any two of these spacer sleeves. In this way the rollers 35 may be located at any desired part along the length of the arms 23, and of course with the collars 34 it is also possible to shift the rollers 35 along the arms 23 to a desired location.

The above described structure operates as follows:

A log 36 is guided between the rollers 35 to the saw blades. The weights 32 and 33 urge the rollers 35 into engagement with the outer side surfaces of the log 36, and the arrangement of Figs. 1 and 2 enables the rollers 35 to adapt themselves to the irregular outer surface of the log 36. The inclined faces 15 limit the outward movement of the rollers 35 while the cross bar 16 limits the inward movement of the rollers 35. Thus, the arrangement may be such that the rollers 35 can each move in either direction from a vertical plane passing through shaft 18 through 15° to 30°. Where the weights 32 and 33 are of equal magnitude the log will be trimmed in planes parallel to its central axis.

Figure 3:
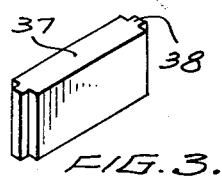
Fig. 3 is a perspective view of a limiting block used with the structure of Figs. 1 and 2.

Fig. 3 shows a block 37 having a length equal to the distance between elements 17 and having at its end faces a pair of rectangular projections 38 adapted to extend into the grooves 39 of elements 17, respectively, so that the block 37 may be guided by elements 17 down to a position on top of the cross bar 16, and of course the elements 17 will hold the block 37 in this position. Thus, this block 37 is capable of limiting the movement of the rollers 35 toward each other to an extent less than the cross bar 16 itself, when desired. Thus, by exchanging one block 37 for another block of the same construction but of a different height, it is possible to regulate the extent to which the rollers 35 move toward each other.

Figure 4:
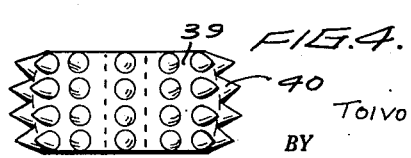
Fig. 4 is a side elevational view of a different type of roller to be used with an assembly of the type shown in Figs. 1 and 2 for a purpose described below.

Fig. 4 shows a spiked roller 39 identical in all respects with the rollers 35 except that the outer surface of the roller 39 is provided with pointed projecting spike portions 40. Thus, the weights will urge the spikes 40 into the material sawed from the logs, and the rollers 39 will guarantee that this material is withdrawn from the logs and from the saw blades so that with the rollers 39 the necessity for interrupting the operations to remove cut material from the saw blades and logs is greatly reduced. Tests over a long period of time show the rollers 39 reduced the number of interruptions and the amount of the material which must be removed from the saw blades by about 80%.

In the particular example shown in Figs. 1 and 2 the arms of each bell crank are located substantially at right angles to each other.

Where the weights 32 and 33 are unequal, as for example 40 kg. and 50 kg., respectively, the sawing paths will be located substantially parallel to the side face under the greater pressure. However, where the weights are equal then the paths of the saw blades will be parallel to the central axis of the log or other irregular stock. Tests have proved that the output is appreciably greater when the weights are unequal than when the weights are equal, the increase in output being from 5 to 10% because of this arrangement.

It will be understood that each of the elements described above, or two or more together, may also find a useful application in other types of saw guides differing from the types described above.

While the invention has been illustrated and described as embodied in means for guiding logs during the sawing thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for sawing elongated stock of irregular cross section, in combination, a base means including a pair of carrying portions located apart from each other, said base means being formed with a free space between said carrying portions thereof; a pair of bell cranks respectively mounted for pivotal movement on said carrying portions of said base means with one of the arms of each bell crank located adjacent said space and with the other of the arms of each bell crank extending from said base means, said other arms of said bell cranks extending in the same direction from said base means; a pair of rollers turnably carried by said other arms of said bell cranks, respectively; and a pair of urging means connected to said one arms of said bell cranks, respectively, for urging said other arms thereof, and said rollers carried thereby, toward each other.

2. In an apparatus for sawing elongated stock of irregular cross section, in combination, a base means including a pair of carrying portions located apart from each other, said base means being formed with a free space between said carrying portions thereof; a pair of bell cranks respectively mounted for pivotal movement on said carrying portions of said base means with one of the arms of each bell crank located adjacent said space and with the other of the arms of each bell crank extending from said base means, said other arms of said bell cranks extending in the same direction from said base means; a pair of rollers turnably carried by said other arms of said bell cranks, respectively; a pair of urging means connected to said one arms of said bell cranks, respectively, for urging said other arms thereof, and said rollers carried thereby, toward each other; and a block carried by said base means in the path through which said urging means tend to move said one arms of said bell cranks for engaging said one arms to limit the movement thereof.

3. In an apparatus for sawing elongated stock of irregular cross section, in combination, a base means including a pair of carrying portions located apart from each other, said base means being formed with a free space between said carrying portions thereof; a pair of bell cranks respectively mounted for pivotal movement on said carrying portions of said base means with one of the arms of each bell crank located adjacent said space and with the other of the arms of each bell crank extending from said base means, said other arms of said bell cranks extending in the same direction from said base means; a pair of rollers turnably carried by said other arms of said bell cranks, respectively; a pair of urging means connected to said one arms of said bell cranks, respectively, for urging said other arms thereof, and said rollers carried thereby, toward each other; and a block removably carried by said base means in the path through which said urging means tend to move said one arms of said bell cranks for engaging said one arms to limit the movement thereof, whereby said block may be exchanged for another block of a different size to change the limits of the movement of said bell cranks.

4. In an apparatus for sawing elongated irregular stock, in combination, an elongated base having a pair of opposed, spaced, substantially parallel side walls and a pair of end portions interconnecting said side walls at the ends thereof, so that said end portions and side walls define a free, substantially rectangular space; a pair of bell cranks located between said side walls and respectively pivoted to said end portions of said base, each bell crank having a first arm located in said space and a second arm extending upwardly from said base; a pair of rollers turnably carried by said second arms of said bell cranks, respectively; a pair of weights respectively connected to said first arms of said bell cranks adjacent the ends thereof for urging the said second arms and the rollers carried thereby toward each other; and limiting means carried by and extending between said side walls of said base beneath said first arms of said bell cranks for limiting the movement of said rollers toward each other.

References Cited in the file of this patent

UNITED STATES PATENTS

| | | |
|---|---|---|
| 40,816 | Buschmann | Dec. 8, 1863 |
| 339,797 | Maxwell | Apr. 13, 1886 |
| 651,666 | Melby | Sept. 11, 1900 |
| 995,883 | Wood | June 20, 1911 |
| 2,374,429 | Hayes et al. | Apr. 24, 1945 |

FOREIGN PATENTS

| | | |
|---|---|---|
| 34,951 | Sweden | June 4, 1913 |
| 42,885 | Norway | May 31, 1926 |